United States Patent [19]

Gerdes et al.

[11] Patent Number: 4,719,135

[45] Date of Patent: Jan. 12, 1988

[54] FUEL IMPERVIOUS POLYMERIC ARTICLE

[75] Inventors: Ernst Gerdes, Dorsten; Friedhelm Mutzberg, Mülheim/Ruhr; Franz Pellengahr, Marl, all of Fed. Rep. of Germany

[73] Assignee: Huels Aktiengesellschaft, Marl, Fed. Rep. of Germany

[21] Appl. No.: 811,849

[22] Filed: Dec. 20, 1985

[30] Foreign Application Priority Data

Dec. 22, 1984 [DE] Fed. Rep. of Germany ....... 3447022

[51] Int. Cl.$^4$ .................... B65D 1/00; B32B 27/08; B32B 27/38
[52] U.S. Cl. ...................... 428/35; 427/230; 427/236; 427/386; 427/393.5; 428/332; 428/336; 428/413; 428/523
[58] Field of Search .............. 428/482, 208, 324, 35, 428/413, 336, 332, 523; 524/538, 539; 525/126; 427/230, 386, 393.5, 236

[56] References Cited

U.S. PATENT DOCUMENTS

| | | | |
|---|---|---|---|
| 4,189,517 | 2/1980 | Shanoski et al. | 428/482 |
| 4,215,170 | 7/1980 | Oliva | 428/208 X |
| 4,222,929 | 9/1980 | Shanoski et al. | 525/126 X |
| 4,245,006 | 1/1981 | Shanoski | 428/482 X |
| 4,375,528 | 3/1983 | Lange | 524/539 X |
| 4,427,740 | 1/1984 | Stackhouse et al. | 428/324 |

FOREIGN PATENT DOCUMENTS

| | | |
|---|---|---|
| 1920822 | 1/1970 | Fed. Rep. of Germany . |
| 2753830 | 6/1978 | Fed. Rep. of Germany . |
| 842905 | 7/1960 | United Kingdom ................. 428/35 |

OTHER PUBLICATIONS

Chemical Abstracts, 95:152272q, p. 84, Nov. 2, 1981.
Desmocap, Edition: 1.5, 1986e, pp. 1-10.

Primary Examiner—Thomas J. Herbert
Attorney, Agent, or Firm—Millen & White

[57] ABSTRACT

The permeability of polymeric articles, particularly fuel tanks and fuel canisters is substantially reduced by thin varnish coatings comprising an epoxy resin, an amine containing curing agent and a flexibilizer.

21 Claims, No Drawings

FUEL IMPERVIOUS POLYMERIC ARTICLE

BACKGROUND OF THE INVENTION

This invention relates to fuel impervious coated articles and more particularly, to epoxy-based fuel resistant coatings on polyethylene substrates.

It is known to manufacture a wide variety of articles such as fuel tanks especially canisters or automobile fuel tanks, from suitable polymeric materials, such as polyethylene. Recently, this technology has assumed increased importance because of its suitability for maximizing space utilization, such as the inaccessible dead spaces present in automobile bodies. This is so since in order to maximize space usage the tanks must be designed with complicated configurations, consequently, tank manufacture from sheet metal is either expensive or impossible. However, such articles are easily produced utilizing, for example, extrusion blow molding methods. Additionally, the low weight of the polymeric fuel tank is particularly advantageous, particularly regarding fuel economy. However, a disadvantage of these articles is that the synthetic resins suitable for utilization as fuel tanks, such as polyethylene, exhibit an undesirable permeability to the hazardous fuels.

It has been suggested to reduce this permeability through the fluorination or irradiation of the polymeric article. Sulfonation has also been disclosed (DAS No. 1,953,371), but this process is burdened by expensive process steps on account of the necessity to drive off the excess sulfur trioxide present, and the subsequent neutralization. Consequently, the problem of reducing the permeability of polymer fabricated fuel tanks still remains a troublesome one for the art.

Although the concept of improving the tanks by a simple varnishing is a known solution, it has been found that a variety of varnish systems including those based on polyvinylidene fluoride, polyvinyl alcohol, and polyamide 6 in conjunction with a variety of primers all exhibit either inadequate fluid barrier properties or unsatisfactory substrate adhesion after being exposed to the presence of the fuel for extended time periods.

Consequently, it is quite surprising to discover that this problem can be solved through the usage of a three-component varnish coat, without the presence of a suitable primer or adhesion promoter, in the manner as set forth herein.

SUMMARY OF THE INVENTION

Accordingly, it is an object of this invention to provide a substantially fuel impervious polymeric article for the coating of a suitable varnish but without the primer or adhesion promoter (i.e., intermediate agents applied to the substrate and/or added to the varnish) that are usually seen in such articles.

Upon further study of the specification and appended claims, further objects and advantages of this invention will become apparent to those skilled in the art.

These and other objects of the invention have been achieved through the utilization of a novel coated article and accompanying process comprising the surprising discovery of a coated polymeric article, e.g., polyethylene having reduced permeability for fuels, particularly gasoline-type fuels, and characterized by a two component, preferably three component, varnish coat comprising: (a) an epoxy resin, e.g., preferably having an epoxy equivalent weight of about 150-280, (b) an effective amount of an amine-based curing agent, e.g., at least one member of (I) and (II):

$$H_2N-CH_2-R_1-NH_2, \tag{I}$$

$$H_2N-R_2-CH_2-R_3-NH_2, \tag{II}$$

wherein $R_1$, $R_2$ and $R_3$ are each independently substituted alkylene or cycloalkylene residues containing 5-10 carbons, and having molecular weights of about 100 to 200. Preferably a third varnish component is further combined with the aforementioned components, i.e., a flexibilizer, e.g., a suitable amount of isocyanate prepolymers, e.g., one based on an isocyanate prepolymer containing ether groups and urethane groups.

This invention also includes a novel process for the production of such coated polymeric articles comprising a method for the production of coated polymeric articles, comprising applying to the article a varnish agent of this invention, e.g., comprising:

(a) an effective amount of an epoxy resin based on a monomer having at least two epoxy groups and having an epoxy equivalent weight of about 150-280; and (b) an effective amount of a curing agent comprising an amine

$$N_2N-CH_2-R_1-NH_2, \text{ or} \tag{I}$$

$$H_2N-R_2-CH_2-R_3-NH_2; \tag{II}$$

wherein $R_1$, $R_2$ and $R_3$ are each, independently, substituted alkylene or cycloalkylene of 5-10 carbons, the amine having a molecular weight of about 100 to 200 without use of a primer or an adhesion promoter.

DETAILED DESCRIPTION

In the broadest embodiment, a wide variety of suitable polymeric substrates are suitable for usage in the invention. Suitable polymers include polyethylene and a wide variety of mixtures and copolymers thereof. Polyethylene itself is the preferred polymer of choice, and includes any polyethylene suitable to be utilized in extrusion blow molding, e.g., of fuel tanks. Preferably, high density polyethylene (HDPE) is utilized, and most preferably HDPE exhibiting the following properties: a density of about 0.935 to 0.950 g/cm³; and melt index 190/21.6, less than about 10 g/10 min. Especially suitable is HDPE exhibiting the following characteristic data: density 0.940 to 0.945 g/cm³, and a melt index 190/21.6=1 to 7 g/10 min.

The varnish coat suitable for coating onto polymeric articles, and particularly polyethylene articles comprises a suitable epoxy resin, and a suitable amine containing curing agent. Preferably a third component comprising a flexibilizer is also included in the coating.

Suitable epoxy resins are those containing more than one epoxide group, e.g., 1.5 to 5, in the monomeric unit. Suitable epoxys are commercially available.

Particularly suitable epoxy resins are, for example, those currently sold under the trade name "Epikote" 828 (Shell), "DER 331" (DOW), and "Rutapox" 0164 (Bakelite). The most preferred is a liquid diglycide ether, prepared from epichlorohydrin and diphenylpropane (bisphenol A). The epoxy-equivalent weights should preferably be in the range of 150 to 280, most preferably 185 to 195. The epoxy-equivalent weight is the resin weight in gram which contains one mole of epoxy groups.

Suitable curing agents for use in the invention are those structured on an amine basis to permit curing to occur at room temperature at suitable rates. Suitable agents include at least one of the diamines set forth in Formulae I and II, i.e.,

$$H_2N-CH_2-R_1-NH_2 \qquad (I)$$

$$H_2N-R_2-CH_2-R_3-NH_2; \qquad (II)$$

wherein $R_1$, $R_2$ and $R_3$ independently are a substituted alkylene or cycloalkylene moiety of 5-10 carbon atoms, possessing a molecular weight ranging from about 100 to 200. Suitable alkylenes and cycloalkylenes for inclusion into (I) and (II) include: The pentylenediamines, the hexylenediamines, cyclohexylenediamine, or methylidenedicyclohexylidenediamine. Suitable accelerators can also be used, e. g., salicylic acid, benzyl dimethylamine or phenyl urea.

Preferably, 2,2,4-trimethylhexamethylenediamine (TMD), the xylidenediamines, diamines containing one or two cyclohexane rings, e.g., 3-amino-methyl-3,5,5-trimethylcyclohexylamine (isophorone diamine (IPD)), or 4,4'-diamino-3,3'-dimethyldicyclohexylmethane can be utilized.

The most preferred curing agent has been found to be a reaction combination obtained by preliminarily reacting by mixing at room temperature, 55 parts by weight of 3-aminomethyl-3,5,5-trimethylcyclohexylamine, 45 parts by weight of a mixture of 2,2,4- and 2,4,4-trimethylhexamethylenediamine, and 40 parts by weight of a suitable epoxy resin having an epoxy-equivalent weight of about 190, and adding thereto a solution of 12 parts by weight of salicylic acid in 88 parts by weight of benzyl alcohol acting as the accelerator.

In order to obtain a suitable amount of crosslinking, a property, particularly desired for fuel impermeability, it is preferred that the particular amine or amines to be used are those which have become part of larger molecules, for example, by a preliminary reaction, e.g., as described above. Therefore, particularly suitable are those reaction products of the aforementioned class of amines with the particular epoxy resins being present in less than stoichiometric amounts (e.g., 10-5% of the stoichiometric amount); the remaining amino groups of these preliminarily crosslinked products are intended for building up the desired thermoset with the epoxy resin.

Although, in the broadest embodiment, the invention can be utilized using only the aforementioned resin and curing agent, a certain flexibility of the varnish film is greatly preferred in order to obtain suitable elasticity, improved impact strength and shock resistance. For this purpose, the epoxy resin varnish comprising of the epoxy and amine curing agent is preferably combined with a suitable flexibilizer. In the broadest embodiment, members of a suitable class of flexibilizers include isocyanate prepolymers; especially preferred are those isocyanates containing ether groups and urethane groups. Most preferably is used a liquid product commercially available under the name of "Desmocap 11" (Bayer).

Although applicants do not wish to be bound by theory, they believe that the crosslinkable NCO groups of these prepolymers react under crosslinking conditions with the diamine curing agent component which is preferably utilized in stoichiometric excess, e.g., from about 1.5 to 1.1, and preferably, 1.3 to 1.1 molar excess over the epoxide groups of component A. The best results are achieved with cycloaliphatic diamines.

The optimum amount of the flexibilizer, e.g., Desmocap 11 is determined empirically and typically is, for example about 3-10%, preferably 5-8 % by weight, based on the entire formulation. Typical amounts of components (A) and (B) within the two- or three-component coating agent are approximately stoichiometric, e.g. equivalents of (A) based on the amount of (B).

In the preferred embodiment, the coating resulting from the reaction of such a flexibilizer with the amines present in the preferred epoxy curing agent varnish combination results in a coating exhibiting good flexibility and the abrasion resistance characteristic of the polyurethane resins along with the chemical resistance of the amine-cured epoxy resins. Another positive aspect is improved adhesion to the polymeric substrate, creating a wide variety of reduced permeability polymeric articles, most preferably fuel tanks reduced in fluid permeability.

The aforementioned varnish and coated article can be prepared by mixing the epoxy resin and the flexibilizer together. Prior to application (pot life about 25 minutes), the curing component is added thereto.

In the broadest embodiment any suitable type of application known to those in the art is feasible, e.g., dipping.

Since it is most desirable to remain in a single production line after blow molding of the polymeric tanks, application of the varnish with a two-component sprayer is particularly advantageous.

The varnish coating cures to a tack-free state after about 12 hours at room temperature, and curing is complete after about 7 days; temperature elevation accelerates the curing process so that a coated tank, treated at 75° C., will be ready for installation after about only 30 minutes. Typical curing temperatures are 60°-85° C. and times 20-60 minutes. If desired, the substrate can be coated while at an elevated temperature, e.g. 30°-50° C.

In the preferred embodiment, it is desired to oxidize the surface of the fuel tanks or other substrates before the varnish is applied. A variety of conventional methods are suitable for this purpose, e.g., low-pressure glow discharge, corona discharge, dipping into heated chromosulfuric acid, flame treatment, and the like. After a suitable pretreatment, the varnish coat can be applied to the internal and/or external surface of the tank, if so desired.

The coated polymeric articles, e.g., molded polyethylene fuel tanks and the like, can be prepared with a wide range of coated thicknesses, depending on the particular application desired, as well as the economics involved. In the polyethylene fuel tank art, thicknesses of the order of 20 to 250 $\mu$m are suitable, and 50 to 150 $\mu$m are most preferred. Multicoats are also possible wherein desirable.

The varnish coats described above effect a barrier action of 60-80% or more with respect to gasoline and diesel fuel, as compared with an untreated tank, at standard temperature and pressure.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE

A varnish formulation is prepared as follows:

(A) 59 parts by weight of an epoxy resin Epikote 828 (Shell) having an epoxy-equivalent weight of between 185 and 195, corresponding to epoxy values of 0.51 to 0.54, is mixed with 7 parts by weight of a flexibilizer (C) sold under the trade name "Desmocap 11" manufactured by Bayer.

Into this mixture of (A) and (C), the following composition (B) is introduced under agitation:

34 parts by weight of a preliminarily reacted mixture of 7.79 parts by weight of 3-aminomethyl-3,5,5-trimethyl-cyclohexylamine, 6.38 parts by weight of a mixture of 2,2,4- and 2,4,4-trimethylhexamethylenediamine, 5.67 parts by weight of epoxy resin as in (A)

1.70 parts by weight of salicylic acid 12.46 parts by weight of benzyl alcohol.

Such a composition is recommended under the tradename "IPD/TMD Blend SE". Huels, A. G. manufactures the isophorone diamine and trimethylhexamethylenediamine.

Blow molded fuel tanks fabricated from HDPE with a density of 0.945 g/cm$^3$, a melt index of 190/21.6=5 g/10 minutes and a carbon black content of 0.1% by weight are superficially flame treated directly prior to varnish application, the surface temperature being above 60° C. The two prepared mixtures comprising the resin and flexibilizer, on the one hand, and the curing agent on the other hand, are applied by a two-component spray gun and curing is effect at elevated temperature of 80° C. The coating thickness measured at 50 μm after curing.

Fuel permeability of the thus-treated fuel tank is reduced by about 80% as compared with an untreated tank. A coating thickness of about 100 μm reduces permeability by far above 80%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coated polymeric article having reduced permeability to fuels, comprising a polymer substrate coated with a cured varnish agent comprising:
    (a) an effective amount of an epoxy resin based on a monomer having at least two epoxy groups and having an epoxy equivalent weight of about 150–280; and
    (b) an effective amount of a curing agent comprising an amine $$H_2N-CH_2-R_1-NH_2, \text{ or} \quad (I)$$

$$H_2N-R_2-CH_2-R_3-NH_2; \quad (II)$$

wherein $R_1$, $R_2$ and $R_3$ are each, independently, substituted alkylene or cycloalkylene of 5-10 carbons, the amine having a molecular weight of about 100 to 200.

2. An article as claimed in claim 1 wherein the varnish agent further comprises a flexibilizer comprising an effective amount of an isocyanate prepolymer.

3. An article as claimed in claim 2 wherein the article is comprised of polyethylene.

4. An article as claimed in claim 3 wherein the polyethylene is HDPE.

5. An article as claimed in claim 4 wherein the article is a fuel tank.

6. An article as claimed in claim 2 wherein the epoxy resin is a liquid diglycide ether, prepared from epichlorohydrin and diphenylpropane.

7. An article as claimed in claim 2 wherein the curing agent is 2,2,4-trimethylhexamethylenediamine, a xylidenediamine, or a diamine containing one or two cyclohexane rings.

8. An article as claimed in claim 2 wherein the curing agent is the reaction product of an amine I or II with a less than stoichiometric amount of an epoxy resin (a).

9. An article as claimed in claim 2 wherein the flexibilizer comprises an isocyanate composition containing ether groups and urethane groups.

10. An article as claimed in claim 2 wherein the flexibilizer is "DESMOCAP 11".

11. An article as claimed in claim 2 wherein the varnish coat has a thickness of about 20 to 250 μm.

12. An article as claimed in claim 2 wherein the epoxy resin and the curing agent are present in substantially stoichiometric amounts.

13. An article as claimed in claim 2 wherein the amount of the flexibilizer is about 3 to 10 wt. % based on the total weight of the varnish agent.

14. A coated article of claim 2 wherein the curing agent comprises isophorone diamine and trimethylhexamethylenediamine.

15. A method for production of a coated polymeric article without application of a primer or an adhesion promoter, comprising
    (A) subjecting the surface of said article to be coated to flame treatment sufficient to raise the temperature of said surface to at least 60° C.; and
    (B) applying to the article a varnish agent comprising:
    (a) an effective amount of an epoxy resin based on a monomer having at least two epoxy groups and having an epoxy equivalent weight of about 150–280; and
    (b) an effective amount of a curing agent comprising an amine $$H_2N-CH_2-R_1-NH_2, \text{ or} \quad (I)$$

$$H_2N-R_2-CH_2-R_3-NH_2; \quad (II)$$

wherein $R_1$, $R_2$ and $R_3$ are each; independently, substituted alkylene or cycloalkylene o 5-10 carbons, the amine having a molecular weight of about 100 to 200 without use of a primer or an adhesive promotor.

16. A method of claim 15 wherein the varnish agent further comprises a flexibilizer comprising an effective amount of an isocyanate prepolymer.

17. A method of claim 15 wherein the polymer is polyethylene.

18. A method of claim 15 wherein the article is a fuel tank.

19. A method as claimed in claim 15 wherein the coating is cured at about 80° C.

20. A high density polyethylene fuel tank coated by the method of claim 15 whereby it possesses a resistance to fuel permeation which is reduced by about 80% as compared with that of the uncoated tank.

21. A method of increasing the resistance of a polymer to permeation by gasoline-type fluids comprising coating the polymer with a coating agent comprising:

(a) a epoxy resin based on a monomer having at least two epoxy groups and having an epoxy equivalent weight of about 150–280;

(b) an effective amount of a curing agent containing at least one of (I) or (II)

$$H_2N-CH_2-R_1-NH_2, \quad (I)$$

$$H_2N-R_2-CH_2-R_3-NH_2; \quad (II)$$

wherein $R_1$, $R_2$ and $R_3$ each independently is substituted alkylene or cycloalkylene of 5–10 carbons having a molecular weight of about 100 to 200, and (c) an effective amount of flexibilizer based on an isocyanate prepolymer, and curing the coated article.

* * * * *